(12) United States Patent
Saitou et al.

(10) Patent No.: US 8,137,037 B2
(45) Date of Patent: Mar. 20, 2012

(54) TOOL FOR REMOVING BURR

(75) Inventors: Yasutaka Saitou, Tokyo (JP); Akio Matsuo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 890 days.

(21) Appl. No.: 12/223,878

(22) PCT Filed: Feb. 2, 2007

(86) PCT No.: PCT/JP2007/052305
§ 371 (c)(1),
(2), (4) Date: Aug. 12, 2008

(87) PCT Pub. No.: WO2007/097204
PCT Pub. Date: Aug. 30, 2007

(65) Prior Publication Data
US 2010/0226727 A1   Sep. 9, 2010

(30) Foreign Application Priority Data
Feb. 20, 2006   (JP) .................. 2006-042920

(51) Int. Cl.
*B23B 49/00* (2006.01)
*B23B 47/22* (2006.01)
*B23B 47/24* (2006.01)
(52) U.S. Cl. ............. 408/11; 408/130; 408/8; 408/14
(58) Field of Classification Search .............. 408/130, 408/10, 11, 12, 6, 7, 8, 14
See application file for complete search history.

(56) References Cited

U.S. PATENT DOCUMENTS

| | | | | |
|---|---|---|---|---|
| 3,133,456 A | * | 5/1964 | Martens | 408/6 |
| 3,264,906 A | * | 8/1966 | Swords | 408/12 |
| 3,647,998 A | * | 3/1972 | Rohraff, Sr. | 200/61.42 |
| 4,056,329 A | * | 11/1977 | Perry | 408/6 |
| 4,180,356 A | * | 12/1979 | Hoch | 408/8 |
| 4,426,177 A | * | 1/1984 | Perry | 408/8 |
| 5,066,176 A | * | 11/1991 | Johnstone | 409/133 |

FOREIGN PATENT DOCUMENTS

| | | |
|---|---|---|
| JP | 55-155907 U | 11/1980 |
| JP | 57-129110 U | 8/1982 |
| JP | 3-40502 U | 4/1991 |

* cited by examiner

*Primary Examiner* — Daniel Howell
*Assistant Examiner* — Paul M Janeski
(74) *Attorney, Agent, or Firm* — Birch, Stewart, Kolasch & Birch, LLP (57) ABSTRACT

A tool for removing burrs detects whether the depths of holes (81, 82, 83) made on a work (W) are prescribed depths or not. The tool (30) for removing burrs includes a tool case (31) and a piston (3) stored to move to and fro in the tool case. The piston has a spindle (12) arranged at its leading end. A judging section (61) judges whether the depth of the hole is normal or not, based on the results of the detection of whether the piston is retracted relatively to the tool case by a piston position detecting mechanism (56) and those of the detection of existence of the tool case by the tool case position detecting means (32).

2 Claims, 8 Drawing Sheets

TOOL FOR REMOVING BURR

TECHNICAL FIELD

The present invention relates to a burr-removing tool that can sense breakage of a burr-removing tool and simultaneously detect a depth of a bottomed hole made on a workpiece when a burr-removing process is performed on the hole.

BACKGROUND ART

The Japanese Utility Model Application Laid-Open Publication No. 57-129110 discloses a burr-removing tool for inserting a tool into a hole of a work, removing foreign material from within the hole, and confirming a depth of the hole. The burr-removing tool will be described based on FIGS. 7 and 8 hereof.

Figure 7:
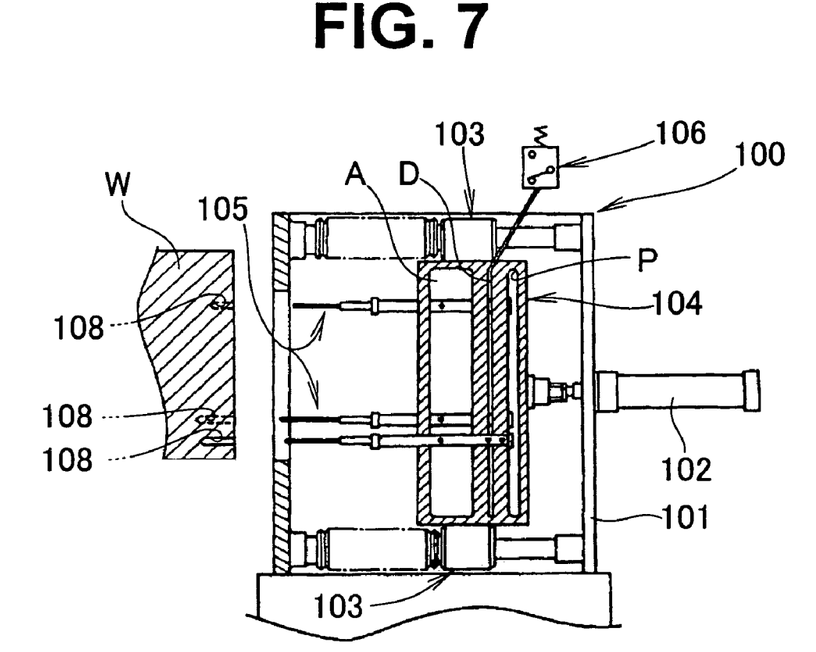
FIG. 7 is a view showing a conventional burr-removing tool.

A burr-removing tool 100 shown in FIG. 7 comprises a base 101; a hydraulic cylinder 102 that is attached to the base 101; an air case 104 retractably provided by the hydraulic cylinder 102 and a slidable supporting member 103, 103; and a plurality of tools 105 retractably attached to the air case 104. The air case 104 comprises a partitioned chamber A, chamber D, and chamber P. Compressed air is supplied to the chamber A and chamber P. A pressure switch 106 is provided in the chamber D.

Figure 8:
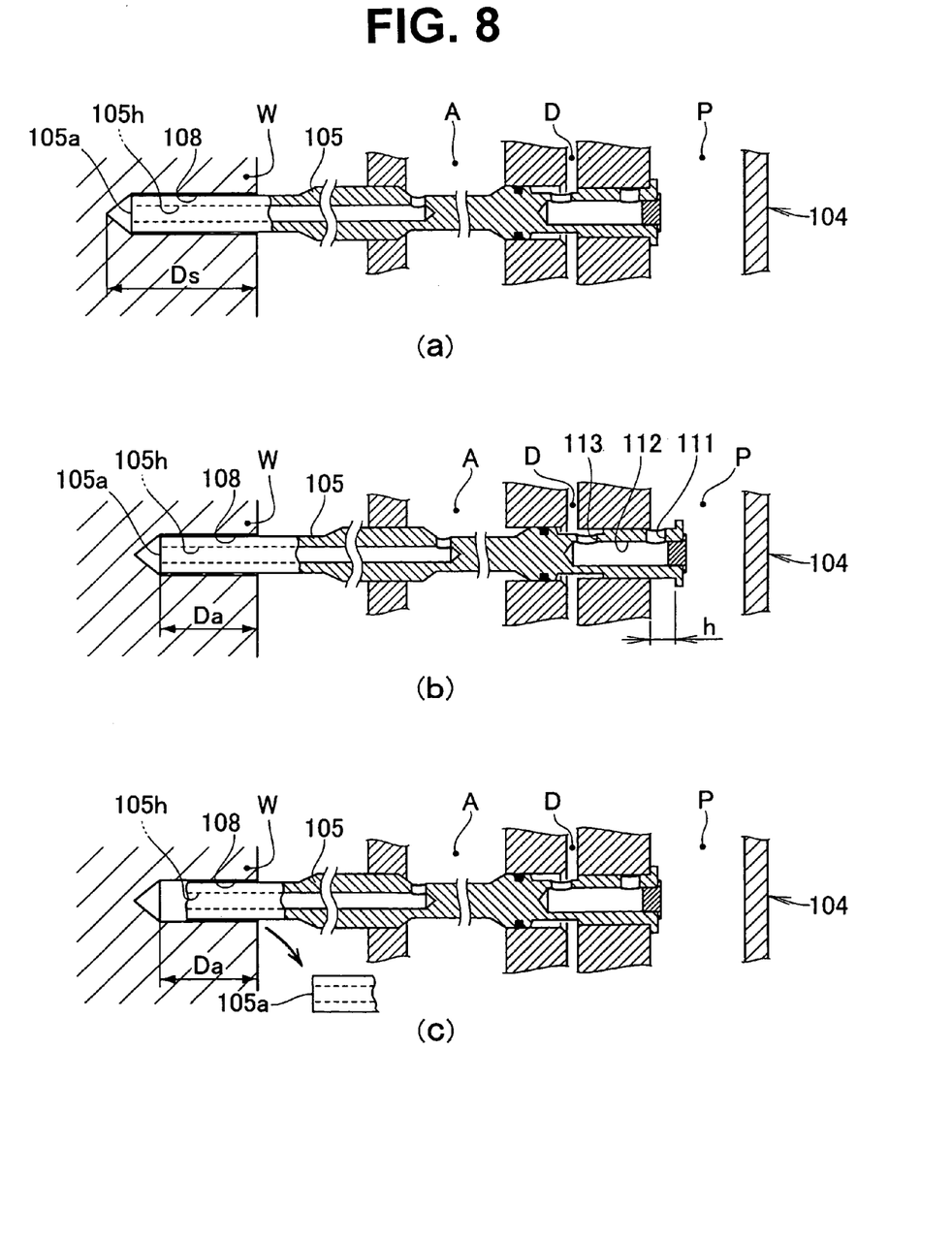
FIG. 8 is a view showing the action of the burr-removing tool of FIG. 7.

FIG. 8(a) to (c) show the air case 104 and the tool 105 being advanced by the hydraulic cylinder 102, the tool 105 being inserted into a hole 108 of the work W, the compressed air of the chamber A being discharged from a leading end 105a through a hole 105h of the tool 105, the foreign material within the hole 108 being removed, and the depth of the hole being detected.

As shown in FIG. 8(a), the tool 105 is urged in an advancing direction by the compressed air of the chamber P when the depth Ds of the hole 108 is normal; therefore, the tool 105 is not displaced with respect to the air case 104. Accordingly, the pressure of chamber D does not change and the pressure switch 106 is not activated; therefore, the depth of the hole 108 is judged to be normal.

As shown in FIG. 8(b), the leading end 105a of the tool 105 hits the bottom of the hole 108 when the depth Da of the hole 108 is less as the reference. Furthermore, when the air case 104 is advanced by the hydraulic cylinder 102, only the air case 104 advances while the tool 105 remains stopped. Therefore, the tool 105 reaches a state of being retracted by displacement h. The compressed air in chamber P flows into chamber D via holes 111, 112, and 113 in the stated order. The air pressure is detected by the pressure switch provided to the chamber D, whereby the depth of the hole is judged to be abnormal.

The tool 105 is in the shape of a syringe needle, and is made of a relatively thin, hollow material; therefore, the leading end may break. The ability for the burr-removing tool 100 to detect such a fault is investigated below.

As shown in FIG. 8(c), a tool 105 having a broken leading end 105a is inserted into the hole 108, whose depth Da is less than the standard depth. The leading end 105a of the tool 105 does not make contact with the bottom of the hole 108. The pressure of the chamber D does not change at this time because the tool 105 does not retract. The pressure switch 106 is accordingly not activated; therefore, the depth of the hole is judged to be normal. A major problem is thus presented in that the depth of the hole is judged to be normal even when it is actually abnormal, and erroneous judgments of this kind need to be eliminated.

DISCLOSURE OF THE INVENTION

An object of the present invention is to provide a burr-removing tool that can detect abnormalities relating to the breaking of a tool and the depth of a hole.

According to the present invention, there is provided a burr-removing tool for inserting a spindle into a bottomed hole made on a workpiece, whereby a burr remaining in the hole is removed and abnormality of a depth of the hole is detected, which burr-removing tool comprises: a tool case capable of moving toward and away from the workpiece; a tool case position detecting means for detecting that the tool case has reached a forward limit position; a piston that is movably accommodated in the tool case; a pushing means for urging the piston towards the workpiece; the spindle, which is provided at a leading end of the piston; a piston position detecting mechanism for detecting a position of the piston according to whether or not the piston has retracted a certain distance from a forward position to which the piston has been pushed, and communication has been established between an air hole opened in the tool case and an air channel formed in the piston; and a judging section for judging whether or not the depth of the hole is normal according to whether or not the tool case has been detected by the tool case position detecting means and whether or not the position of the piston has been detected by the piston position detecting mechanism.

The tool is provided with the tool case position detecting means for detecting that the tool case has reached the forward limit position; therefore, the forward limit position of the tool case can be detected.

The position of the piston, which can move to or fro in the tool case, is detected using a phenomenon wherein the piston is accommodated, and communication is established or disestablished between the air channel formed on the outer periphery of the piston and the air holes in the tool case.

When the depth of the hole is less than the standard hole depth, the spindle removes the burrs while rotating, and a leading end of the spindle reaches a bottom of the hole. When the burr-removing tool then advances further, the piston integrated with the spindle retracts relatively into the tool case. The piston position detecting mechanism detects that the piston has retracted when communication is established between the air holes and the air channel. The tool case position detecting means, however, does not detect the forward limit position of the tool case. Therefore, the hole depth is judged to be less than the standard hole depth, and abnormal.

When the hole depth is greater than the standard value, the spindle performs the burr removal while rotating; however, the leading end of the spindle does not reach the bottom of the hole, and the piston remains at a position where communication is not established between the air holes and the air channel. The tool case position detecting means, however, detects the forward limit position. Therefore, the depth of the hole is decided to be greater than the standard hole depth and abnormal.

Hole depth abnormalities can thus be determined and accurately judged because it is possible to detect instances of when the depth of the hole is not as deep or is deeper than the standard value of the hole depth.

In addition, when the hole depth is greater than the standard hole depth, detecting the abnormality makes it possible to judge that the spindle used as a tool has broken.

Preferably, the judging section judges the depth of the hole to be abnormal by the piston being detected by the piston position detecting mechanism and the tool case (31) not being detected by the tool case position detecting means; and judges the depth of the hole to be abnormal by the piston not being detected by the piston position detecting mechanism and the tool case being detected by the tool case position detecting means.

BEST MODE FOR CARRYING OUT THE INVENTION

Figure 1:
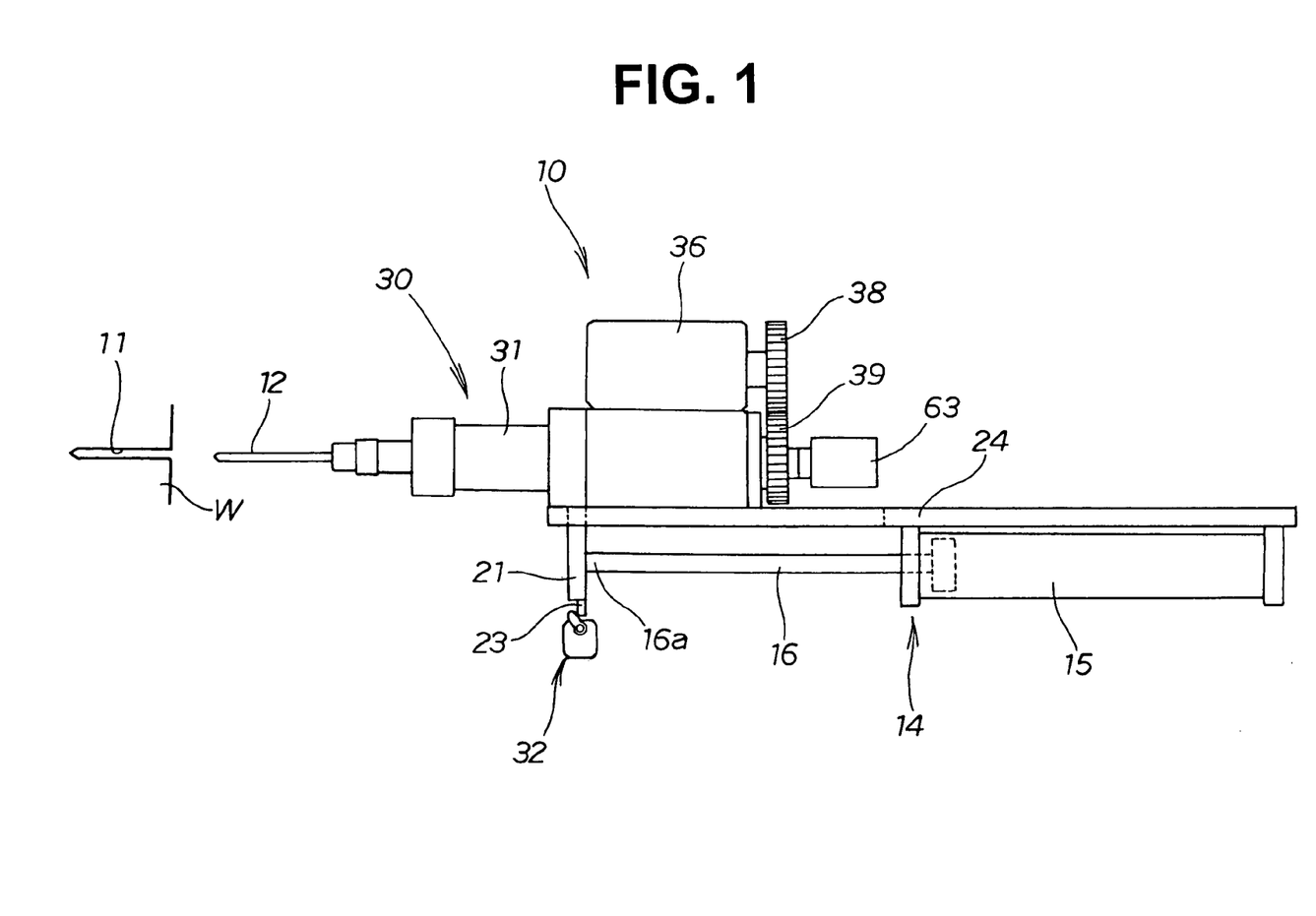
FIG. 1 is a burr-removing device comprising a burr-removing tool according to the present invention.

A burr-removing device 10 shown in FIG. 1 comprises a burr-removing tool 30 that inserts a spindle 12 into a hole 11 made on a workpiece W, removes a burr, and detects whether the depth of the worked hole 11 is abnormal; and a cylinder portion 14 that lies parallel to the direction of movement of the burr-removing tool 30 and moves the burr-removing tool 30 to and fro in relation to the worked hole 11.

The cylinder portion 14 comprises a cylinder case 15; a rod portion 16 retractably provided to the cylinder case 15; a connecting member 21 that is provided to a leading end 16a of the rod portion 16 and that connects the leading end 16a to the burr-removing tool 30; a detection piece 23 that is attached to the connecting member 21 and that moves the forward limit position of a tool case 31 to tool case position detecting means 32; and a guide member 24 on which the burr-removing tool 30 is moved by the rod portion 16.

Figure 2:
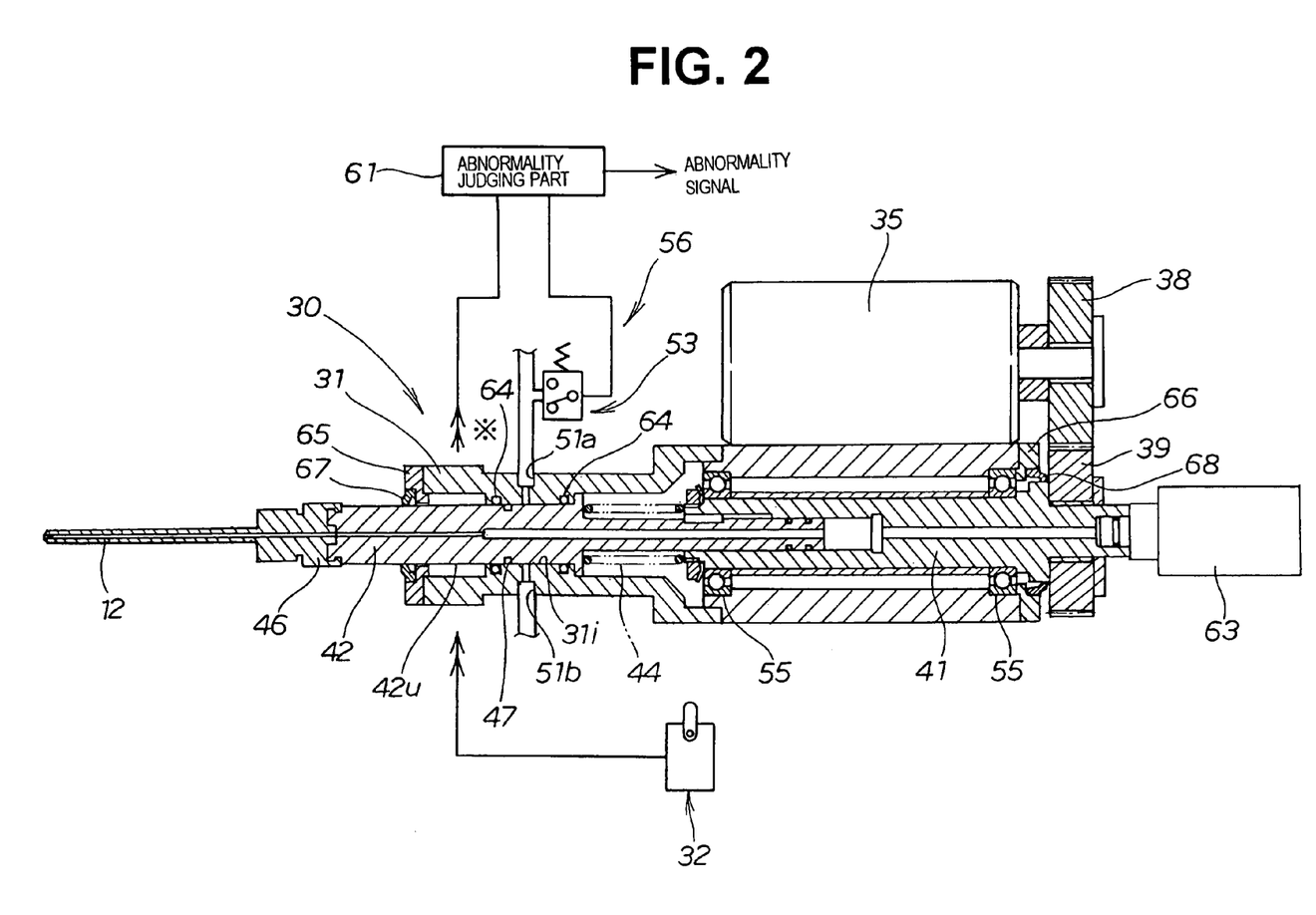
FIG. 2 is a cross-sectional view showing the burr-removing tool of FIG. 1.

As shown in FIG. 2, the burr-removing tool 30 comprises the tool case 31 that can be advanced toward and retracted from the workpiece; the tool case position detecting means 32 for detecting that the tool case 31 has reached the forward limit position; a hydraulic motor 35 that is attached to the tool case 31 and that acts as rotary drive means for driving the spindle 12; a rotating holder 41 that is driven by the hydraulic motor 35 via a pair of gears 38, 39; a piston 42 that rotates unitarily with the rotating holder 41 and is advanceably and retractably accommodated in the tool case 31; a spring member 44 used as means for pushing the piston 42 towards the workpiece; the spindle 12, which is attached to a leading end of the piston 42 via a chuck member 46; an air channel 47 having an annular groove that is formed on an outer peripheral surface 42u of the piston 42; air holes 51a, 51b that are opened above and below an inner peripheral surface 31i of the tool case 31 in order to transmit compressed air via the air channel 47; and piston position detecting means 53 provided to detect a change in pressure in the air holes 51a, 51b. The rotating holder 41 is rotatably supported within the tool case 31 via a bearing 55, 55.

The piston position detecting mechanism 56 includes a pressure switch, which is the piston position detecting means 53, and detects the position of the piston 42 by a phenomenon wherein communication is established between the air holes 51a, 51b opened in the tool case 31 and the air channel 47 formed in the piston 42 and air is transmitted when the air holes and air channel are in a communication position where the piston 42 has retracted a certain distance from a forward position to which it has advanced; and wherein communication between the air holes 51a, 51b and the air channel 47 is disestablished when the piston 42 is at the forward position and air is not transmitted.

The burr-removing tool 30 is provided with an abnormality-judging section 61 for judging that an abnormality has occurred when either the piston position detected by the piston position detecting mechanism 56 or the forward limit position of the tool case detected by the tool case position detecting means 32 is not detected.

In the drawing, reference number 63 is a cleaning fluid pressure feed unit for feeding cleaning fluid to the spindle 12; reference number 64, 64 is an O ring that is provided to the outer peripheral surface 42u of the piston 42 and prevents air leakage; reference numbers 65, 66 are cover members for sealing the front and back of the tool case 31; and reference numbers 67, 68 are seal members.

The hydraulic motor 35 is given as an example of rotation drive means in the present embodiment; however, an electric motor or pneumatic motor are acceptable as well.

The tool case position detecting means 32 can also be a limit switch or a contact switch.

Figure 3:
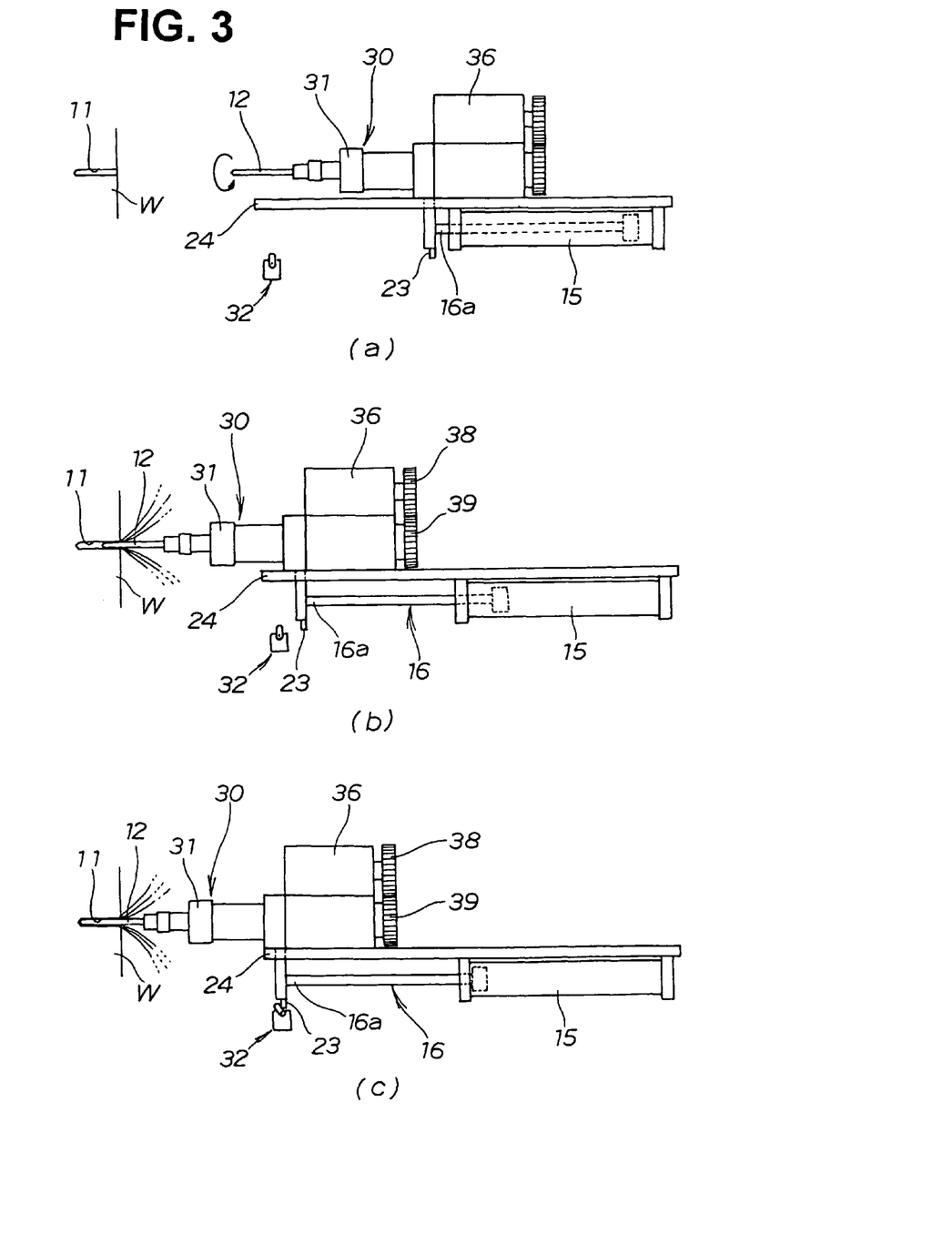
FIG. 3 is a view showing a movement of a cylinder device of FIG. 1.

Drawings (a), (b), (c) in FIG. 3 show the to and fro state of the burr-removing tool 30 in relation to the hole 11.

Drawing (a) shows a state in which the burr-removing tool 30 begins to advance toward the hole 11 of the workpiece W along the guide member 24 from the retraction limit of the tool case 31 while the spindle 12 of the tool case 31 rotates.

Drawing (b) shows a state in which the spindle 12 is entering the hole 11 of the workpiece 11 while rotating.

Drawing (c) shows a state in which the detection piece 23 provided to the leading end 16a of the rod portion 16 is in contact with the tool case position detecting means 32 disposed on the forward limit position of the tool case 31. The tool case position detecting means 32 detects the forward limit position of the tool case 31 at this time.

Figure 4:
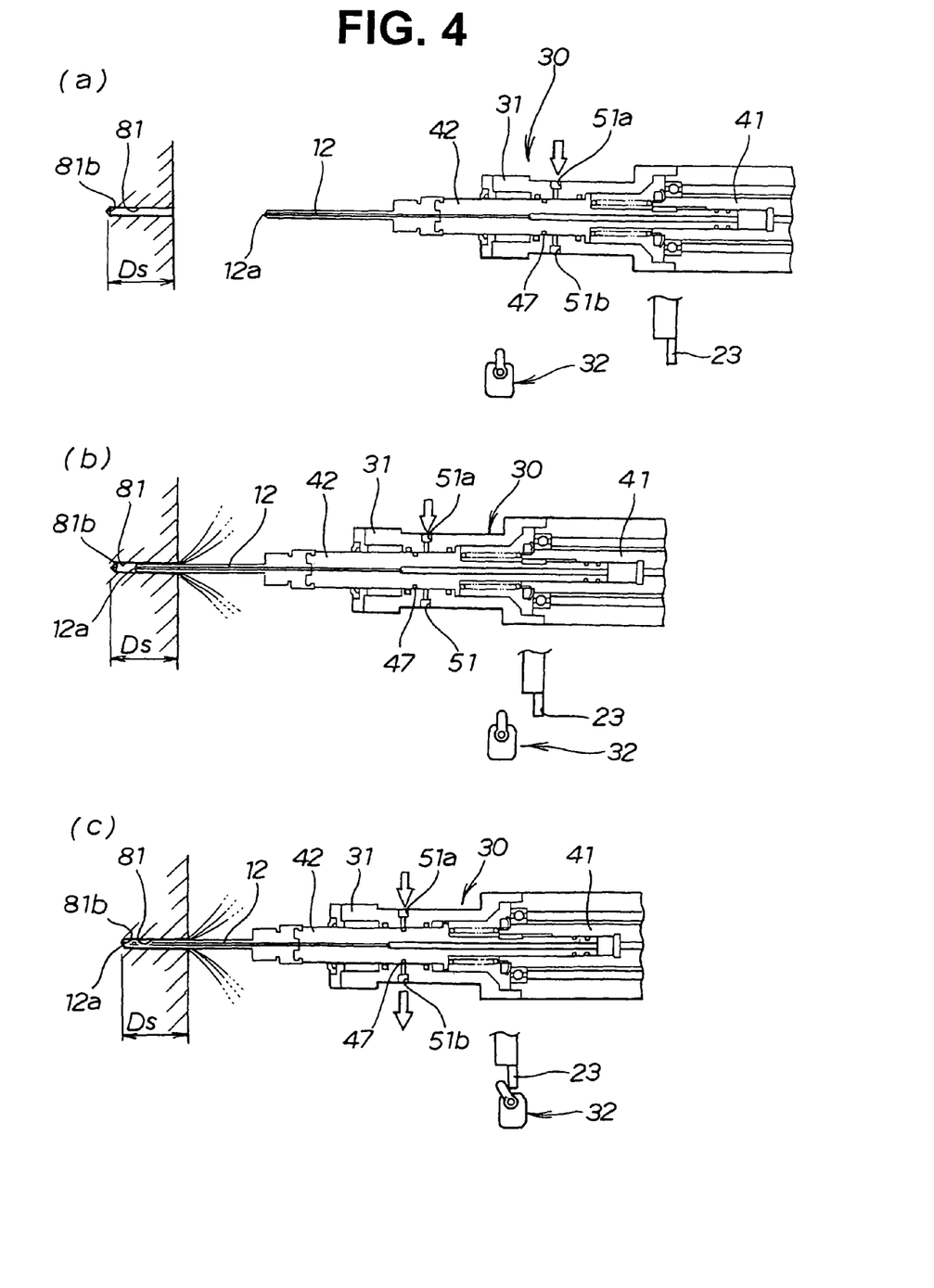
FIG. 4 is a view showing a movement of the burr-removing tool when the hole is of normal depth.

The operation of the burr-removing tool when the depth of the hole is normal will now be described based on drawings (a), (b), (c) in FIG. 4.

As shown in drawing (a), the spindle 12 of the tool case 31 advances, while rotating, towards a hole 81 having a standard hole depth Ds.

As shown in drawing (b), the spindle 12 advances further while rotating, and performs burr removal in the hole 81.

As shown in drawing (c), when the burr-removing tool 30 has advanced further after a leading end 12a of the spindle 12 has reached a bottom 81b of the hole 81, the piston 42, which is integrated with the spindle 12, retracts into the tool case 31 in resistance against the spring member 44 (FIG. 2); communication is established between the air holes 51a, 51b and the air channel 47; air is transmitted; and the piston position detecting means 53 (FIG. 2) detects the position of the piston 42. The tool case position detecting means 32 simultaneously detects the forward limit position of the tool case 31. Therefore, the abnormality-judging section 61 shown in FIG. 2 does not decide that an abnormality has occurred, and judges the depth of hole 81 to be normal.

Figure 5:
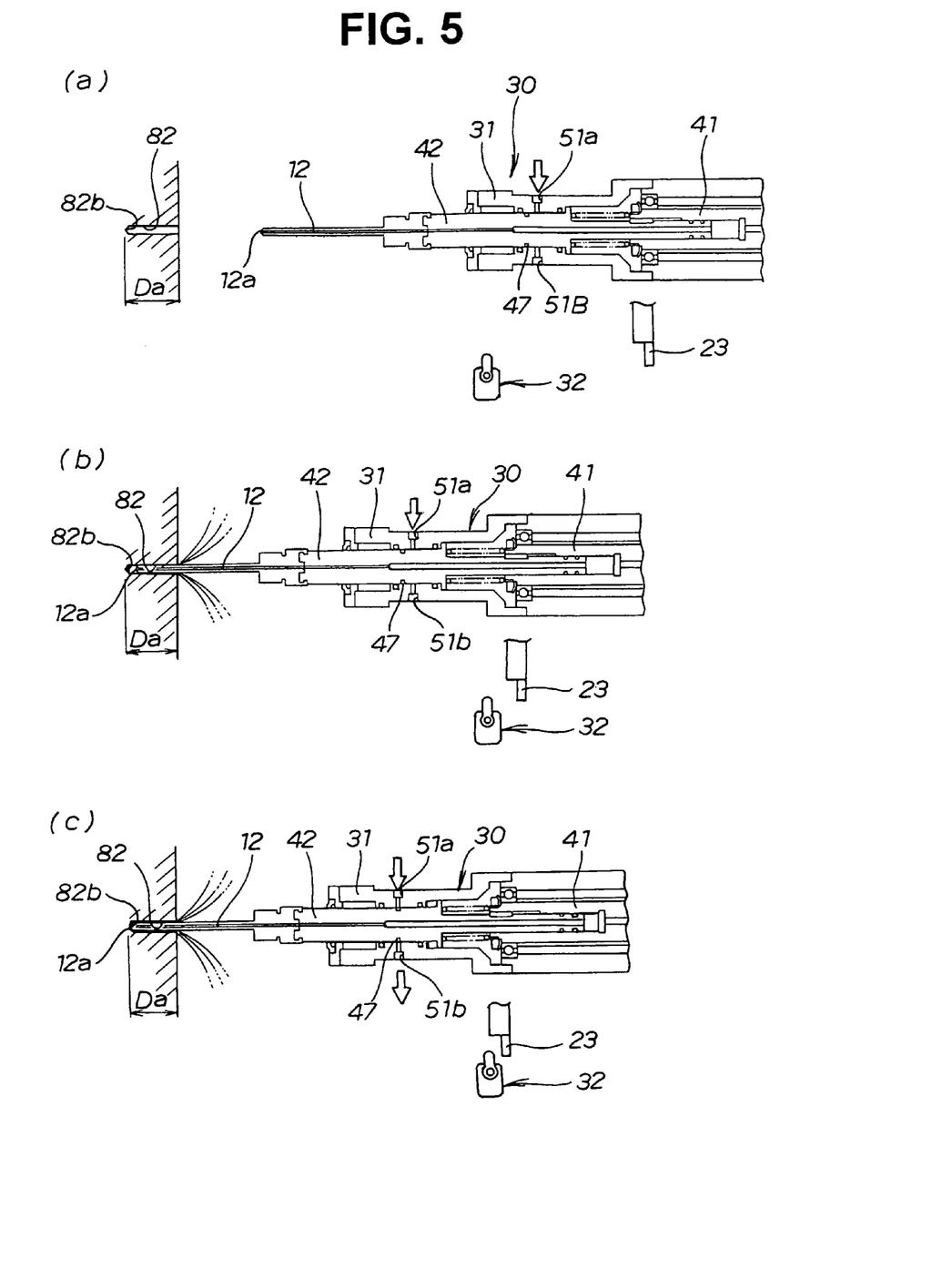
FIG. 5 is a view showing the movement of the burr-removing tool when the hole is not as deep as a reference value.

Drawings (a), (b), (c) in FIG. 5 show the operation of the burr-removing tool when the hole is not as deep as a reference value.

As shown in drawing (a), the spindle 12 of the tool case 31 advances, while rotating, towards a hole 82 having a depth Da that is less than the standard hole depth Ds.

As shown in drawing (b), the spindle 12 advances further while rotating, and performs burr removal in the hole 82.

As shown in drawing (c), when the burr-removing tool 30 has advanced further after a leading end 12a of the spindle 12 has reached a bottom 82b of the hole 82, the piston 42, which is integrated with the spindle 12, retracts into the tool case 31 in resistance against the spring member 44 (FIG. 2); communication is established between the air holes 51a, 51b and the air channel 47; air is transmitted; and the piston position detecting means 53 (FIG. 2) detects the position of the piston 42. The tool case position detecting means 32, however, does not detect the forward limit position of the tool case 31. Therefore, the abnormality-judging section 61 shown in FIG. 2 decides that an abnormality has occurred, and judges the depth of hole 82 to be abnormal.

Figure 6:
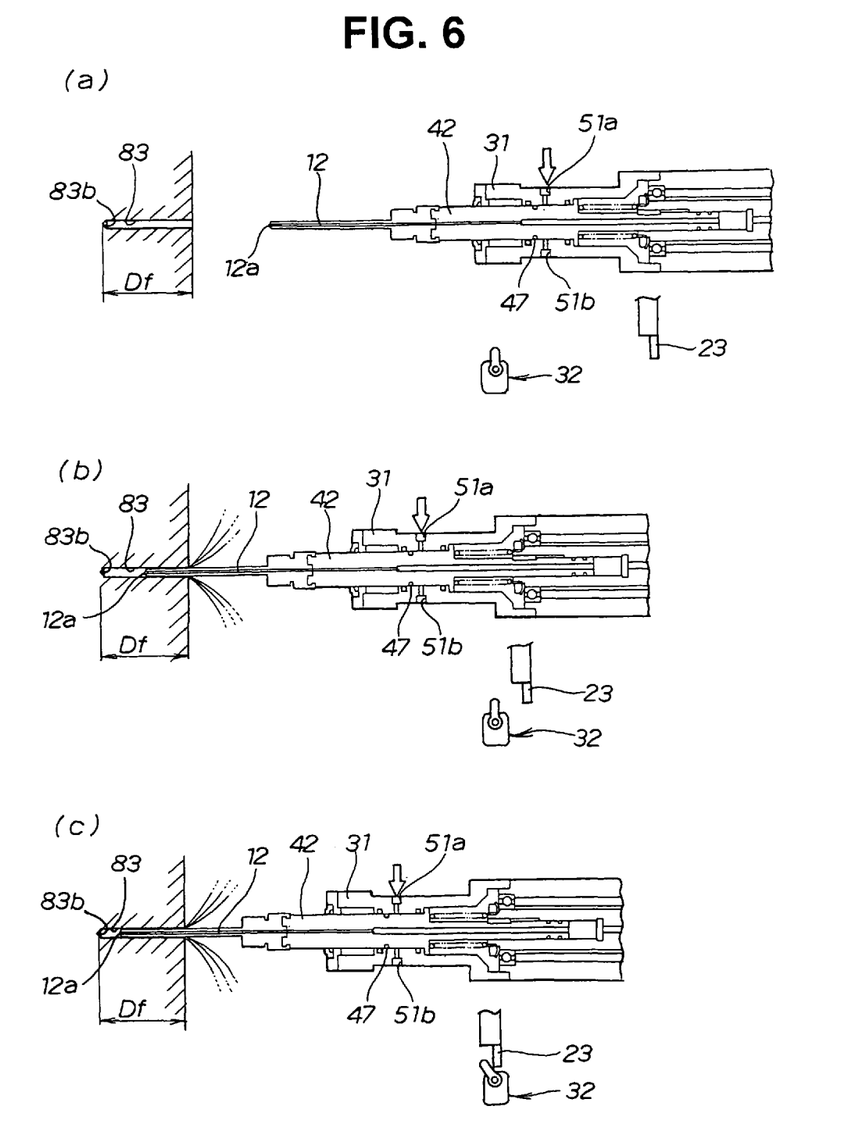
FIG. 6 is a view showing the movement of the burr-removing tool when the hole is deeper than the reference value.

Drawings (a), (b), (c) in FIG. 6 show the operation of the burr-removing tool when the hole is deeper than a reference value.

As shown in drawing (a), the spindle 12 of the tool case 31 advances, while rotating, towards a hole 83 having a depth Df that is less than the standard hole depth Ds.

As shown in drawing (b), the spindle 12 advances further while rotating, and performs burr removal in the hole 83.

As shown in drawing (c), the leading end 12a of the spindle 12 does not reach the bottom 83b of the hole 83, and communication is not established between the air holes 51a, 51b and the air channel 47. The tool case position detecting means 32, however, detects the forward limit position of the tool case 31; therefore, the abnormality-judging section 61 decides that an abnormality has occurred. The depth Df of the hole is therefore judged to be abnormal.

According to the table below, the depth of the hole is only judged to be normal when the piston position detecting mechanism detects the piston position and when the tool case position detecting means detects the forward limit position of the tool case.

TABLE

| Case | Detecting of piston position | Detecting of forward limit of tool case | Decision | Remarks |
|---|---|---|---|---|
| 1 | ON | YES | Normal | Normal hole depth |
| 2 | ON | NO | Abnormal | Hole not deep enough (foreign matter left in hole) |
| 3 | OFF | YES | Abnormal | Hole too deep (burr-removing tool broke) |

The hole is judged to be too deep when the piston position detecting mechanism does not detect the piston position and when the tool case position detecting means detects the forward limit position of the tool case. The forward limit position of the tool case can be detected even when the spindle 12 is broken.

Since the burr-removing tool 30 is able to detect the breaking of the spindle 12, a hole depth detecting device thus need not be provided in addition to a burr-removing device or other working device. The cost of equipment can therefore be reduced.

Furthermore, space for the steps can be saved because an inspection step does not have to be provided in addition to the working step.

According to the present embodiment, an example is shown wherein the invention is applied to a bottomed hole of an engine crankshaft in an automotive vehicle; however, the invention can also be used to remove burrs of shaft members used in automobiles or in bottomed holes of typical machine parts other than shaft members.

INDUSTRIAL APPLICABILITY

The present invention is particularly suitable for working a bottomed hole formed on a crankshaft of an engine.

The invention claimed is:

1. A burr-removing tool for inserting a spindle into a bottomed hole made on a workpiece, whereby a burr remaining in the hole is removed and abnormality of a depth of the hole is detected, the tool comprising:
    a tool case capable of advancing toward and retracting from the workpiece;
    tool case position detecting means for detecting that the tool case has reached a forward limit position;
    a piston movably accommodated in the tool case;
    pushing means for urging the piston towards the workpiece;
    the spindle provided at a leading end of the piston;
    a piston position detecting mechanism for detecting a position of the piston according to whether or not the piston has retracted a certain distance from a forward position to which the piston has been pushed, and communication has been established between an air hole formed in the tool case and an air channel formed in the piston; and
    a judging section for judging whether or not the depth of the hole is normal according to whether or not the tool case has been detected by the tool case position detecting means and whether or not the position of the piston has been detected by the piston position detecting mechanism.

2. The burr-removing tool of claim 1, wherein the judging section judges the depth of the hole to be abnormal by the piston being detected by the piston position detecting mechanism and the tool case not being detected by the tool case position detecting means, and judges the depth of the hole judged to be abnormal by the piston not being detected by the piston position detecting mechanism and the tool case being detected by the tool case position detecting means.

* * * * *